United States Patent
Lim et al.

(10) Patent No.: US 9,710,245 B2
(45) Date of Patent: Jul. 18, 2017

(54) MEMORY REFERENCE METADATA FOR COMPILER OPTIMIZATION

(71) Applicant: QUALCOMM Incorporated, San Diego, CA (US)

(72) Inventors: Chu-Cheow Lim, San Jose, CA (US); David Samuel Brackman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 14/245,946

(22) Filed: Apr. 4, 2014

(65) Prior Publication Data

US 2015/0286472 A1    Oct. 8, 2015

(51) Int. Cl.
*G06F 9/45* (2006.01)
*G06F 9/455* (2006.01)

(52) U.S. Cl.
CPC .............. *G06F 8/443* (2013.01); *G06F 8/434* (2013.01); *G06F 9/45516* (2013.01); *G06F 9/45525* (2013.01)

(58) Field of Classification Search
USPC ........................................................ 717/151
See application file for complete search history.

(56) References Cited

U.S. PATENT DOCUMENTS

| | | | |
|---|---|---|---|
| 7,565,631 B1 | 7/2009 | Banerjee et al. | |
| 8,886,887 B2 * | 11/2014 | Cascaval et al. | 711/137 |
| 2003/0033510 A1 * | 2/2003 | Dice | 712/235 |
| 2003/0172293 A1 | 9/2003 | Johnson et al. | |
| 2004/0205740 A1 | 10/2004 | Lavery et al. | |
| 2006/0059326 A1 * | 3/2006 | Aasheim et al. | 711/203 |
| 2007/0050603 A1 | 3/2007 | Vorbach et al. | |
| 2008/0313621 A1 * | 12/2008 | Beyer | 717/160 |
| 2009/0070753 A1 | 3/2009 | Chen et al. | |
| 2010/0042815 A1 | 2/2010 | Gonion et al. | |
| 2011/0320763 A1 * | 12/2011 | Gonion | 711/210 |

(Continued)

OTHER PUBLICATIONS

"OpenGL Programming Guide: The Official Guide to Learning OpenGL, Version 1.1, Chapter 14," Jan. 1, 1997, 21 pp.

(Continued)

*Primary Examiner* — Li B Zhen
*Assistant Examiner* — Bradford Wheaton
(74) *Attorney, Agent, or Firm* — Shumaker & Sieffert, P.A.

(57) ABSTRACT

An apparatus includes a memory and a compiling processor configured to: generate, by at least one of a group consisting of a compiler and a runtime executing on the compiling processor, arguments for executing a compiled kernel, determine, by the at least one of the group executing on the compiling processor, whether a first memory reference to a first memory region and a second memory reference to a second memory region of the arguments refer to a same memory region, generate, by the at least one of the group, metadata associated with the first memory reference and the second memory reference based on the determination, wherein the metadata indicates a relationship between the first memory region and the second memory region. The at least one of the compiler and the runtime may recompile the kernel based on the metadata, and instruct a target processor to execute the recompiled kernel.

30 Claims, 5 Drawing Sheets

(56) References Cited

U.S. PATENT DOCUMENTS

| | | | |
|---|---|---|---|
| 2012/0259843 A1* | 10/2012 | Child | G06F 17/30519 707/722 |
| 2012/0272224 A1* | 10/2012 | Brackman | 717/151 |
| 2012/0317558 A1 | 12/2012 | Agarwal et al. | |
| 2013/0132684 A1* | 5/2013 | Ostrovsky et al. | 711/147 |
| 2013/0141443 A1* | 6/2013 | Schmit | G06F 8/41 345/505 |
| 2013/0194286 A1* | 8/2013 | Bourd et al. | 345/545 |
| 2013/0290662 A1* | 10/2013 | Teal | 711/163 |

OTHER PUBLICATIONS

International Search Report and Written Opinion from International Application No. PCT/US2015/021585, dated Jun. 5, 2015, 14 pages.

Margiolas C et al., "HYDA: A HYbrid Dependence Analysis for the adaptive optmisation of OpenCL kernels", Adaptive Self-Tuning Computing Systems, ACM, 2 Penn Plaza, Suite 701 New York NY 10121-0701 USA, Jan. 22, 2014 (Jan. 22, 2014), pp. 5-7, XP058035360,DOI: 10.1145/2553062.2553069 ISBN: 978-1-4503-2514-1.

Mikushin D et al., "KerneiGen—the design and implementation of a next generation compiler platform for accelerating numerical models on GPUs", USI Technical Report Series in Informatics, USI-INF-TR-2013-2, Jul. 1, 2013 (Jul. 1, 2013), pp. 1-14, XP055191803, Retrieved from the Internet: URL:http://inf.unisi.ch/file/pub/75/tech_report2013.pdf retrieved on May 28, 2015].

Response to Written Opinion dated Jun. 5, 2015, from International Application No. PCT/US2015/021585, filed on Feb. 4, 2016, 6 pp.

Second Written Opinion from International Application No. PCT/US2015/021585, dated Apr. 11, 2016, 7 pp.

Response to Second Written Opinion dated Apr. 11, 2016, from International Application No. PCT/US2015/021585, filed on Jun. 8, 2016, 25 pp.

International Preliminary Report on Patentability from International Application No. PCT/US2015/021585, dated Jul. 4, 2016, 10 pp.

* cited by examiner

```
__kernel void compute_output(__global uchar* inputImage,
__global uint* global_cdf,         /─ 82
__global uchar* outputImage,
__local uint* local_cdf) {
                    /─ 84
  <Initializations>
                                          /─ 86
  for (int i = start_offset; i < final_offset; i ++) {  /─ 88
      outputImage[i] = local_cdf[ inputImage[i] ];
  }
}
```
FIG. 3A
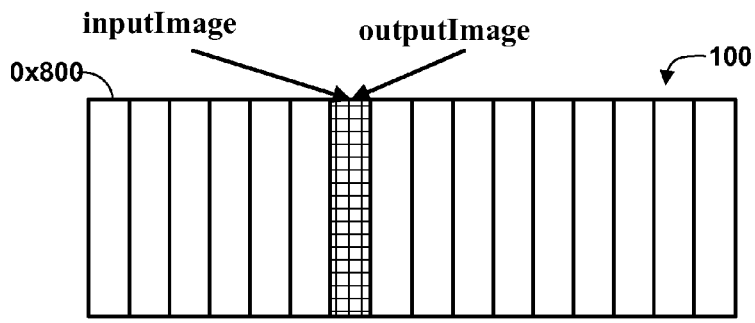
FIG. 3B
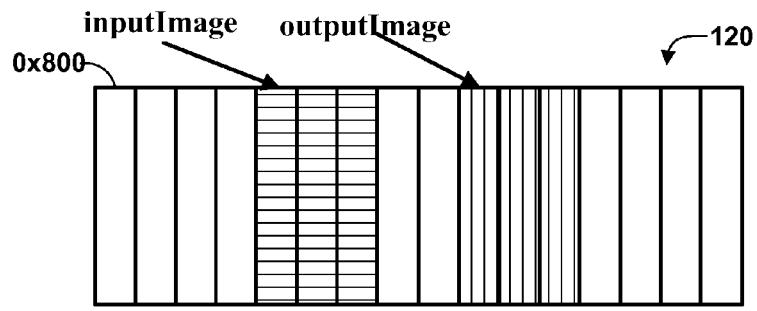
FIG. 3C
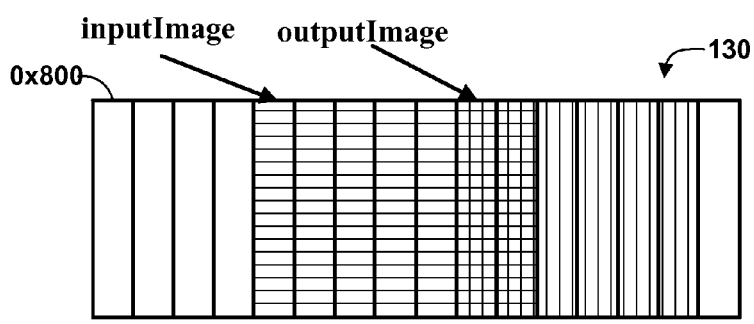
FIG. 3D

140 ─┐

```
for (int i = start_offset; i < final_offset; i += 4) {  ┌─142
    outputImage[i]   = local_cdf[ inputImage[i]   ];    └─144
    outputImage[i+1] = local_cdf[ inputImage[i+1] ];    ┌─146
    outputImage[i+2] = local_cdf[ inputImage[i+2] ];    ┌─148
    outputImage[i+3] = local_cdf[ inputImage[i+3] ];    ┌─150
}
```

FIG. 4A

160 ─┐
```
r0 <- ldg   inputImage[i];       ┌─162
r1 <- ldg   inputImage[i+1];     ┌─164
...
r0 <- ldl   local_cdf[r0];       ┌─166
r1 <- ldl   local_cdf[r1];       ┌─168
...
outputImage[i]   <- stg  r0;     ┌─170
outputImage[i+1] <- stg  r1;     ┌─172
...
```

FIG. 4B

180 ─┐
```
r0 .. r3 <- ldg   inputImage[i], 4    ┌─182
r0 .. r3 <- ldl   local_cdf[r0], 4    ┌─184
outputImage[i] <- stg  r0 .. r3, 4    ┌─186
```

FIG. 4C

MEMORY REFERENCE METADATA FOR COMPILER OPTIMIZATION

TECHNICAL FIELD

This disclosure relates to compiling source code of kernels, and more particularly, to techniques for compiling source code of kernels for memory access

BACKGROUND

There has been a move toward so-called heterogeneous computing architectures. In heterogeneous computing architectures, a program, referred to as a kernel, may be compiled using a framework such that a variety of different types of processors, such as a CPU (Central Processing Unit), GPU (Graphics Processing Unit), FPGA (Field Programmable Gate Array), etc., may execute the kernel. Recent frameworks that support heterogeneous computing include the OpenCL framework, as well as the DirectCompute framework.

SUMMARY

This disclosure describes techniques for detecting memory aliasing and memory overlap of memory references in a kernel in order to generate metadata for compiling optimizations. To perform the techniques of this disclosure, a compiler such as a just-in-time compiler (JIT) compiles a source code of a program, also referred to as a "kernel" into a binary file. A compiling processor, executing the compiler, may compile the kernel using a heterogeneous computing framework, such as OpenCL, at runtime (when the compiling processor generates arguments needed for executing the kernel). In the techniques described in this disclosure, instead of instructing a target processor to execute the kernel using the generated arguments, a driver analyzes the arguments, which are passed together in a buffer, that are to be passed to the target processor that is to execute the kernel. Based on the analysis, the driver/runtime generates metadata indicating a relationship (e.g., whether the memory region of the first memory reference and the second memory reference overlap, to what extent, etc.) between the first memory reference and the second memory reference.

If the memory regions are not the same, the compiling processor may use the compiler to recompile the kernel based on the metadata, and using more aggressive compilation techniques, such as loop unrolling, etc. The driver may also be able to determine to what extent memory accesses of the kernel overlap, and may recompile the kernel using more aggressive techniques based on the amount of memory overlap. In this manner, the techniques of this disclosure may increase the execution performance of a kernel that is compiled using a just-in-time compiler.

In one example, this disclosure describes a method comprising: generating, by at least one of the group consisting of a compiler and a runtime executing on a compiling processor, arguments for executing binary code of a compiled kernel, determining, by the at least one of the group consisting of the compiler and the runtime executing on the compiling processor, whether a first memory reference to a first memory region of the kernel arguments and a second memory reference to a second memory region of the kernel arguments refer to a same memory region, generating, by the at least one of the group consisting of the compiler and the runtime executing on the compiling processor, metadata associated with the first memory reference and the second memory reference based on the determination. The metadata may indicate a relationship between the first memory region and the second memory region. The method further includes responsive to determining, by the at least one of the group consisting of the compiler and the runtime executing on the compiling processor, that first and second memory references of the kernel do not refer to the same memory region: causing, by the at least one of the group consisting of the compiler and the runtime executing on the compiling processor, a compiler to recompile the kernel based on the metadata, and instructing, by the at least one of the group consisting of the compiler and the runtime executing on the compiling processor, a target processor to execute the recompiled kernel.

In another example, this disclosure describes a device that includes a memory and a compiling processor configured to: generate, by at least one of a group consisting of a compiler and a runtime executing on the compiling processor, arguments for executing binary code of a compiled kernel, determine, by the at least one of the group consisting of the compiler and the runtime executing on the compiling processor, whether a first memory reference to a first memory region of the kernel arguments and a second memory reference to a second memory region of the kernel arguments refer to a same memory region, generate, by the at least one of the group consisting of the compiler and the runtime executing on the compiling processor, metadata associated with the first memory reference and the second memory reference based on the determination. The metadata may indicate a relationship between the first memory region and the second memory region, and responsive to determining, by the at least one of the group consisting of the compiler and the runtime executing on the compiling processor, that first and second memory references of the kernel do not refer to the same memory region, the compiling processor is further configured to: cause, by the at least one of the group consisting of the compiler and the runtime executing on the compiling processor, a compiler to recompile the kernel based on the metadata, and instruct, by the at least one of the group consisting of the compiler and the runtime executing on the compiling processor, a target processor to execute the recompiled kernel.

In another example, this disclosure describes a non-transitory computer-readable storage medium storing instructions that, when executed, cause a compiling processor to: generate, the at least one of a group consisting of a compiler and a runtime executing on the compiling processor, arguments for executing binary code of a compiled kernel, determine, by the at least one of the group consisting of the compiler and the runtime executing on the compiling processor, whether a first memory reference to a first memory region of the kernel arguments and a second memory reference to a second memory region of the kernel arguments refer to a same memory region, generate, by the at least one of the group consisting of the compiler and the runtime executing on the compiling processor, metadata associated with the first memory reference and the second memory reference based on the determination. The metadata indicates a relationship between the first memory region and the second memory region.

Responsive to determining, by the at least one of the group consisting of the compiler and the runtime executing on the compiling processor, that first and second memory references of the kernel do not refer to the same memory region, the compiling processor may be further configured to execute instructions that cause the compiling processor to: cause, by the at least one of the group consisting of the compiler and the runtime executing on the compiling processor, a compiler to recompile the kernel based on the metadata, and instruct, by the at least one of the group consisting of the compiler and the runtime executing on the compiling processor, a target processor to execute the recompiled kernel.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3A is a conceptual diagram illustrating kernel code that includes code that, when executed, may cause aliasing in accordance with the techniques of this disclosure.

FIG. 3B is a conceptual diagram illustrating an example of aliasing that a compiler configured in accordance with the techniques of this disclosure may be able to detect.

FIG. 3C is a conceptual diagram illustrating an example of non-overlapping memory references, which a compiler configured in accordance with the techniques of this disclosure may be able to detect.

FIG. 3D is a conceptual diagram illustrating overlapping memory references that a driver/runtime configured in accordance with the techniques of this disclosure may detect.

FIG. 4A is a conceptual diagram illustrating loop unrolling in accordance with the techniques of this disclosure.

FIG. 4B is a conceptual diagram illustrating code reordering in accordance with the techniques of this disclosure.

FIG. 4C is a conceptual diagram illustrating code vectorization in accordance with the in accordance with the techniques of this disclosure.

DETAILED DESCRIPTION

Figure 1:
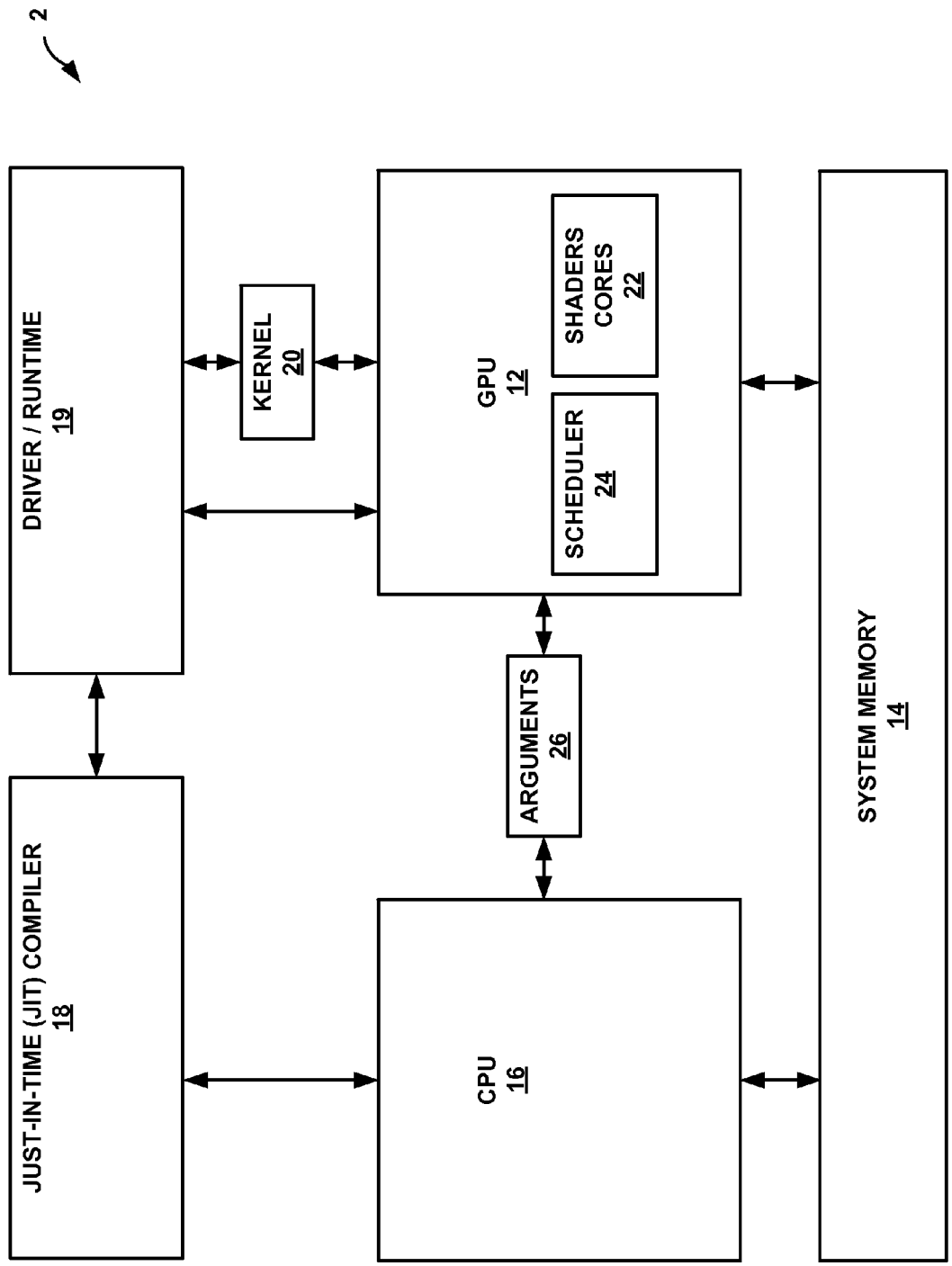
FIG. 1 is a block diagram illustrating an example computing device that supports aliasing analysis to aid compiling optimization in accordance with the techniques of this disclosure.

As described briefly above, various heterogeneous computing frameworks are currently under development. Some examples of heterogeneous computing frameworks include the OpenCL™ framework, currently under development by the Khronos group, and the DirectCompute framework, which is currently being developed by Microsoft®. Heterogeneous computing frameworks allow a single program or "kernel" to execute on a variety of different processors, such as a CPU (Central Processing Unit), a GPU (Graphics Processing Unit), an FPGA (Field Programmable Gate Array), DSP (Digital Signal Processor), etc.

To prepare a kernel for execution, a processor, referred to in this disclosure as a compiling processor, compiles kernel source code to generate binary code to be executed by a target processor. The target processor may be the same processor or a different from the target processor. One example of the compiler that the compiling processor uses is referred to as a just-in-time compile (JIT) compiler. A JIT compiler compiles source code at execution time (also referred to as runtime), rather than prior to execution (sometimes referred to as "ahead of time" compilation) or without previously compiling instructions at all (referred to as "interpretation").

Once the kernel has been compiled, the compiling processor, via a driver and a runtime, transfers the compiled binary code of the kernel to the target processor. The kernel also accepts a set of arguments at runtime for executing the kernel on the target processor, which the compiling processor also transfers to the target processor. The kernel arguments comprise a buffer, i.e. an area of memory allocated for the arguments. In most cases, the kernel includes code sections that operate on (i.e., read to or write from) the arguments. In this manner, the arguments comprise a data set for the kernel that the kernel may operate over. After transferring the kernel to the target processor, the driver/runtime of the compiling processor executes a function call that provides the arguments to the kernel at runtime in some examples. Once the kernel has received the arguments, the target processor may commence execution of the kernel.

In many instances, the kernel includes code segments, such as loops, that execute until the target processor determines that some Boolean condition has been met or for some number of iterations. A compiler may be able to employ various techniques to improve the performance of executing loop code sections, for example loop unrolling, as well as other techniques, such as code reordering, and/or vectorization that may improve the performance of both loop and non-loop code sections.

Loop unrolling is an optimization process by which the compiler expands several iterations of the loop to reduce or eliminate instructions that control the loop, such as arithmetic operations, end of loop tests, and/or to improve cache performance when executing the loop. Code reordering is another optimization, which a compiler may use to group a series of similar instructions (e.g. loads or stores together). Code reordering may improve cache performance when executing a loop code section in some cases. For example, code reordering may improve performance when coalescing a number of load instructions (e.g., within a loop body) together may improve performance on a system having a cache line width (discussed in greater detail below) that is a multiple of the size of the operand used in the scalar instruction. However, it may only be safe for the compiler to coalesce the loads if the compiler determines, prior to compilation, that the load/store buffers do not alias each other. Otherwise, data corruption could occur due to the reordered load/store instructions.

Vectorization is another optimization process by which a compiler may convert source code that includes several scalar operations, each of which processes a single pair of operands at a time, to a vector instruction, which processes one operation on multiple pairs of operands at once. Vectorization is a form of parallelization that may improve performance relative to a scalar implementation of the same code. Loop unrolling, code reordering, and vectorization are described in greater detail below.

Code sections of a kernel may contain memory references, also referred to as "pointers," which may refer to a memory area of the arguments. For example, a code section may include a series of memory references that may refer to portions of the kernel arguments (i.e., memory references to the buffer included in the kernel arguments). The kernel may read values from the arguments buffer, and may also write data to the arguments buffer.

In some cases, different memory references, e.g. pointer variables having different names, may reference the same data location in memory. The situation in which different symbolic references reference a same memory region is referred to as "aliasing." A compiler may attempt to detect aliasing at compile time using static analysis or other techniques. However, a compiler is usually unable to detect aliasing of memory references in loops when the data that memory references in loop code sections refer to (e.g., kernel arguments) is supplied at runtime.

When a compiler is unable to definitively determine whether memory references refer to a same memory region (i.e. the memory references result in aliasing), the compiler may be unable to perform optimization techniques, such as loop unrolling and vectorization to the loop. The techniques of this disclosure may enable a JIT compiler to determine whether memory accesses of a kernel loop refer to a same memory region. Additionally, the techniques of this disclosure enable a JIT compiler to generate metadata about a relationship between memory references, and to recompile the kernel using optimizations, such as vectorization and loop unrolling based on the generated metadata.

FIG. 1 is a block diagram illustrating an example computing device that supports aliasing analysis to aid compiling optimization in accordance with the techniques of this disclosure. FIG. 1 includes computing device 2. Computing device 2 may comprise a personal computer, a desktop computer, a laptop computer, a computer workstation, a tablet computing device, a video game platform or console, a wireless communication device (such as, e.g., a mobile telephone, a cellular telephone, a satellite telephone, and/or a mobile telephone handset, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a CPU 16, a system memory 14, a graphics processing unit (GPU) 12, just-in-time (JIT) compiler 18, and driver/runtime 19. CPU 16 may execute various types of applications. Examples of the applications include web browsers, e-mail applications, spreadsheets, video games, applications that generate viewable objects for display, and the like. Instructions for execution of the one or more applications may be stored within system memory 14.

CPU 16 may also execute JIT compiler 18. Accordingly, CPU 16 may be referred to, for the purposes of example, as a "compiling processor." JIT Compiler 18 comprises a compiler that, when executed by CPU 16, may compile source code of a kernel using a heterogeneous computing framework, such as OpenCL or DirectCompute, as described above. JIT compiler 18 compiles source code into native code or intermediate code (e.g., bytecode) for execution by a target processor. JIT compiler 18 performs compilation at "runtime," i.e. at the time of execution as opposed to before execution. JIT compiler 18 may perform compilation using the clBuildProgram( ) function when compiling using OpenCL. Additionally, JIT compiler 18 may be configured to analyze data access patterns of kernel 20 to determine whether data accesses of certain fibers (i.e. threads) executing on the target processor, GPU 12, are independent, as well as if other conditions hold.

Driver/runtime 19 also interacts with JIT compiler 18 to translate kernel source code to binary instructions or bytecode instructions. Driver/runtime 19 may use the driver to perform architecture-specific compilation of kernel source code instructions to native or object code for the target processor (GPU 12 in this example). For example, driver/runtime 19 may be aware of specific vector instructions or execution resources available to the target processor, and may compile the source code to native code in a way that optimizes execution performance on the target processor. In some examples, there may be different drivers, for example if there are multiple target processors, e.g. if the kernel is to execute on CPU 16 and GPU 12.

Kernel 20 is comprised of native or object code, e.g. binary instructions, that the target processor, GPU 12 in this example, is capable of executing. JIT Compiler 18 may also manage runtime execution of GPU 12. CPU 16 may transmit kernel 20 to GPU 12 for execution. CPU 16 may also generate arguments 26, which CPU 16 may transfer to GPU 12 for further processing.

Before allocating arguments 26, CPU 16 allocates a free memory buffer, which is a region of memory, for arguments 26. Once the buffer has been allocated, driver/runtime 19 stores arguments 26 in the buffer. Arguments 26 may comprise a plurality of data values (e.g., integers, floating point values, objects, arrays of values, etc.) that GPU 12 is capable of processing. Additionally, during execution of kernel 20, GPU 12 may write data to the buffer that stores arguments 26 as output. The outputted data may comprise output arguments, which GPU 12 may transfer back to CPU 16.

The arguments that CPU 16 transfers to GPU 12 may be referred to as "input arguments." In an example where the heterogeneous computing framework is the OpenCL framework, driver/runtime 19 may generate the arguments and pass (make available) to the clSetKernelArg( ) function at run-time. The clSetKernelArg( ) function receives the kernel 20 as an argument, as well as any of kernel arguments 26 and transfers the arguments to GPU 12 so that execution may begin.

As part of allocating memory for arguments 26, driver/runtime 19 determines an address and a memory region of arguments 26 that is associated with some or all of the memory references included in the kernel. The memory references may be memory references of specific code sections, for example code sections that include loops, referred to as "loop code sections." Based on the determined memory regions, driver/runtime 19 may be able to resolve (i.e., determine) whether memory references of loops code sections or other code sections of kernel 20 refer to a same memory region of arguments 26.

Responsive to generating the kernel arguments 26 for GPU 12 to execute kernel 20, driver/runtime 19 may execute kernel 20. More particularly, driver/runtime 19 may dispatch kernel 20 to the target processor, GPU 12 using the clEnqueueNDRangeKernel( ) function. At runtime, driver/runtime 19 analyzes arguments 26, which kernel 20 receives. Driver/runtime 19 also analyzes memory references (e.g., pointers), etc. to determine whether memory references refer to a same memory region of the memory region allocated for arguments 26. Driver/runtime 19 may analyze the memory references and arguments buffers in a pairwise fashion to determine whether the memory references refer to a same memory region.

Driver/runtime 19 further generates metadata associated with the memory references based on the relationship between the memory regions of arguments 26 to which the memory references refer. The metadata may indicate a relationship between memory references. For instance, the metadata may include a list of overlapping memory references, whether the memory regions associated with the memory regions overlap, to what extent the memory regions overlap, and how many bytes the overlap comprises, as some non-limiting examples.

Driver/runtime 19 provides the generated metadata (if any) back to JIT compiler 18. Responsive to determining that two memory references do not share the exact same memory region based on the metadata, driver/runtime 19 may cause JIT compiler 18 may recompile kernel 20 using various optimizations, such as loop unrolling, code reordering and/or vectorization. JIT compiler 18 may apply these various optimizations of loop unrolling code reordering, and/or vectorization based on the generated metadata.

In accordance with the techniques of this disclosure, a compiling processor, e.g. CPU 16 may be configured to generate, using at least one of a group consisting of JIT compiler 18 and driver/runtime 19 executing on a compiling processor, arguments 26 for executing code (e.g., binary code or object code) of a compiled kernel 20. The at least one of the group consisting of JIT compiler 18 and driver/runtime 19 may be further configured to determine whether a first memory reference to a first memory region of the kernel arguments and a second memory reference to a second memory region of the kernel arguments refer to a same memory region. Responsive to determining, by the at least one of the group consisting of JIT compiler 18 and driver/runtime 19, that first and second memory references of the kernel do not refer to the same memory region, CPU 16 may be further configured to: cause, with the at least one of the group consisting of JIT compiler 18 and driver/runtime 19 executing on the CPU 16, the at least one of the group consisting of JIT compiler 18 and driver/runtime 19 to recompile kernel 20 based on the metadata, and instruct, by the at least one of the group consisting of JIT compiler 18 and driver/runtime 19 executing on the CPU 16, a target processor, e.g. GPU 12, to execute the recompiled kernel 20.

GPU 12 may be specialized hardware that allows for massively parallel processing, which is well-suited well for processing graphics data. In this way, CPU 16 offloads graphics processing that is better handled by GPU 12. CPU 16 may communicate with GPU 12 in accordance with a particular application processing interface (API) or heterogeneous computing framework. Examples of such APIs include the DirectX® API by Microsoft® and OpenGL® by the Khronos group; examples of heterogeneous computing frameworks include DirectCompute by Microsoft, OpenCL™ by the Khronos group. However, aspects of this disclosure are not limited to the APIs and frameworks described above, and may be extended to other types of APIs.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure are applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a examples, a non-transitory storage medium may store data that can, over time, change (e.g., in RAM).

Using JIT compiler 18 and driver/runtime 19, CPU 16 may compile source code into native code (e.g., commands and data) or bytecode for GPGPU applications. Example GPGPU data and commands include commands and scene data for a ray tracing application, a physics simulation, or data for any other type of GPGPU kernel. GPGPU applications, e.g. kernel 20, may also be compiled using a graphics API, such as DirectX, or OpenGL, or using a more general purpose compute API, such as Open Compute Language (OpenCL), or OpenCompute, or DirectCompute. CPU 16 may transmit the data for the kernel 20 to a command buffer for processing. In various examples, the command buffer may be part of system memory 14, or part of GPU 12. In some examples, CPU 16 may transmit the commands and data of kernel 20 for GPU 12 to process via a special purpose bus, such as a PCI-Express bus or another general purpose serial or parallel bus.

To perform the operations of kernel 20 stored in the command buffer, GPU 12 may implement a processing pipeline. The processing pipeline includes performing functions as defined by software or firmware executing on GPU 12 and performing functions by fixed-function units that are hardwired to perform very specific functions. It may be possible to bypass the fixed-function units for execution of kernel 20 or the execution of kernel 20 may use the fixed-function units.

Kernel 20 may execute on one or more processing elements (also referred to as "shader cores" or "PEs") of GPU 12. Shader cores 22 provide users with functional flexibility because a user can program the shaders to execute desired tasks in any conceivable manner, as with any other processor. The fixed-function units, however, are hardwired for the manner in which the fixed-function units perform tasks. Accordingly, the fixed-function units may not provide much functional flexibility. The techniques of this disclosure are directed toward execution of a kernel, such as kernel 20, on GPU shader cores 22.

Once CPU 16 transmits the data and/or commands associated with rendering a graphical scene or executing a kernel to the command buffer, GPU 12 begins execution of the commands through the pipeline of GPU 12. Scheduler 24 of GPU 12 creates threads, which perform the basic unit of work associated with the kernel. Scheduler 24 assigns the threads to a particular processing element of shader cores 22.

Figure 2:
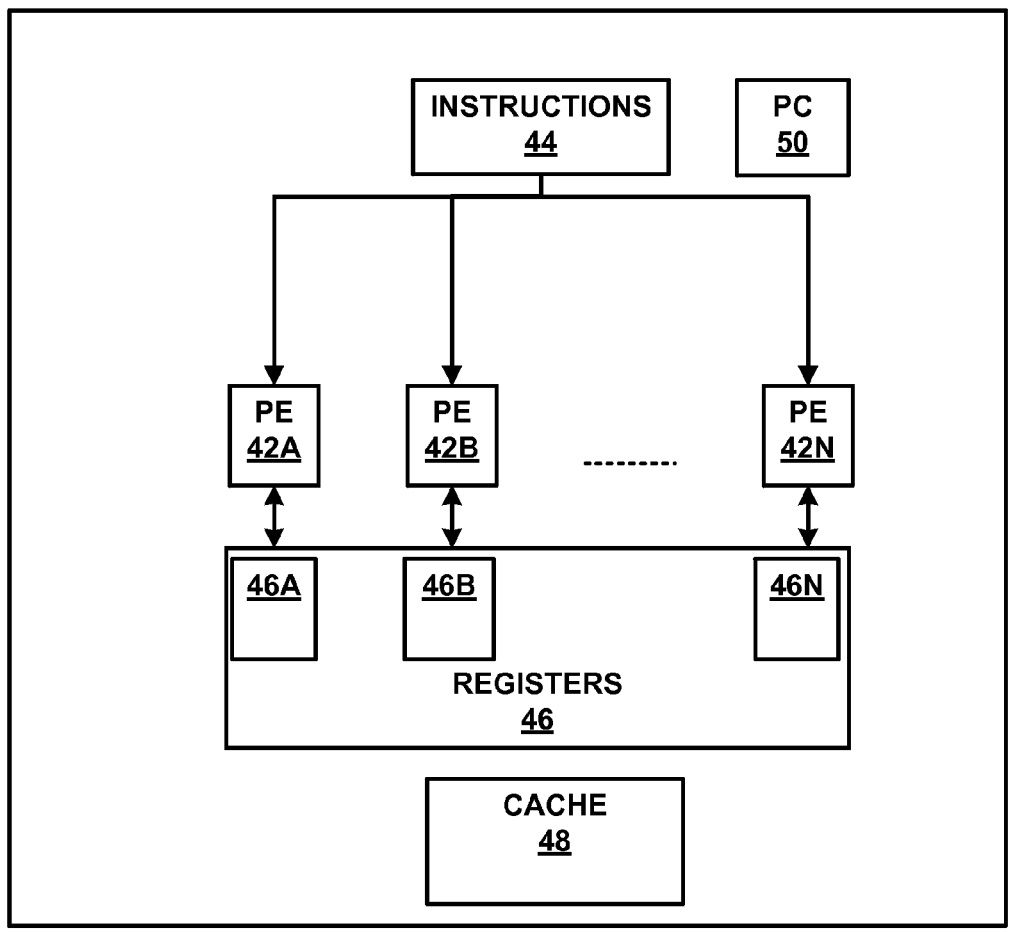
FIG. 2 is a conceptual diagram illustrating a plurality of processing elements of one or more shader cores of a processor that may execute a kernel in accordance with the techniques of this disclosure.

FIG. 2 is a conceptual diagram illustrating a plurality of processing elements of one or more shader cores of a processor that may execute a kernel in accordance with the techniques of this disclosure. FIG. 2, illustrates part of GPU 12 or CPU 16. GPU 12 includes a plurality of processing elements 42A-42N (PEs 42), which may execute a portion of a kernel, e.g. kernel 20. In some examples, the portion of kernel 20 that may execute on PEs 42 may be referred to as a "warp" or a "work unit." PEs 42 may be a part of one or more of shader cores 22 (FIG. 1). A warp or a work unit, may comprise a group of threads, also referred to as "fibers," which GPU scheduler 24 may assign to a plurality of processing elements, e.g. PEs 42, for execution. Each PE of FIG. 2 may comprise a single instruction multiple data (SIMD) unit, capable of executing a single instruction, such as a vector instruction, on multiple data values at a particular time (e.g., at a same time for parallel execution). PEs 42 may also support execution of a single instruction on a single data value, such as a single operation on a single floating point value.

FIG. 2 also includes instructions 44 that a scheduler of GPU 12 assigns PEs 42 for execution. In some examples, instructions 44 may be stored in a command buffer. Instructions 44 may include a set of instructions of a kernel that each PE is configured to execute. Program counter (PC) 50 indicates the current instruction that one or more of PEs 42 are to execute. After an instruction finishes executing on PEs 42, the value of PC 50 may be incremented to the address of the next instruction of kernel 20. FIG. 2 also includes registers 46. Registers 46A-46N (registers 46) may be general purpose registers capable of holding multiple data values or a single value. Registers 46 may be "banked," that is, may load and store data for particular PE. As an example, register 46A may be limited to storing data for PE 42A, and may not load or store data for other PEs. Each of registers 46 may supply data to and/or from one of PEs 42, which PEs 42 may then process.

PEs 42, instructions 44, registers 46, cache 48, and PC 50 may comprise a core or part of shader cores 22 of GPU 12. In various examples, warp 40 may comprise part of a shader, such as a geometry shader, pixel shader, and/or a vertex shader, which may be part of a graphics pipeline of GPU 12 or comprise part of a kernel such as kernel 20. In some examples, GPU 12 may feed the results generated by a warp into another stage of the pipeline for additional processing.

FIG. 2 also includes cache 48. Cache 48 is a small memory that stores frequently accessed instructions and data for fast retrieval and storage during execution. Although illustrated as a single cache, cache 48 may represent multiple cache levels and/or separate caches. As described above, during execution of kernel 20, GPU 12 retrieves one of instructions 44 located at the address indicated by the value of PC 50. GPU 12 then causes PEs 42 to execute the instruction stored at the address of PC 50, which may be a register in some examples.

Rather than fetch the instruction at the address of PC 50 from system memory, which would be needlessly slow, GPU 12 checks cache 48 to determine if cache 48 currently includes the next instruction to be executed. The portion of cache 48 that stores instructions is referred to as the instruction cache ("I-cache"). If the next instruction to be executed is stored in cache 48, referred to as a "cache hit," GPU 12 loads and executes the cached instruction. If the next instruction to be executed is not stored in cache 48, referred to as a "cache miss," GPU 12 loads the next instruction for execution from some slower memory, for example from system memory 14.

During execution of an instruction that requires a data value (e.g., an operand) that is stored at a memory address (e.g., add, multiply, load, store, etc.), GPU 12 first determines whether the operand is stored within a register, e.g. one of registers 46. If the requested data value is not stored in registers 46, then GPU 12 attempts to access the data value from the portion of cache 48 that holds data values, referred to as the data cache ("d-cache"). If the data value is stored within cache 48, GPU 12 loads the requested data value from cache 48. Otherwise, GPU 12 must load the requested data value from a slower memory, e.g. system memory 14. Similarly, if an instruction causes PEs 42 to store or modify a data value back into memory, cache 48 may store that value to cache 48 so that if it written or read from again, the data value quickly retrieved or overwritten from or to cache 48 in the event that the data value is not stored in one of registers 46.

GPU 12 transfers data to and from cache 48 in fixed size blocks, referred to as cache "lines." Cache 48 may have the capacity to store hundreds or thousands of different lines. Each line is associated with a particular memory address, and may store multiple bytes of data. For example, each line of cache 48 may store 64 bytes of data, as one example. The number of bytes stored in each line is referred to as the cache "width." In an example where cache 48 has lines that can store 64 bytes of data, the cache width of cache 48 is 64 bytes. The cache width may impact the performance of code reordering optimization techniques, as will be discussed in greater detail below.

During a load operation that retrieves data from cache 48, GPU 12 may load the retrieved cache data into one or more of registers 46, or other registers not pictured. During execution of an instruction, PEs 42 may read one or more data values from registers 46. PEs 42 may perform one or more operations on the data values, and store new values back to registers 46. PEs 42 may execute flow control instructions, such as branches, jumps, gotos, etc. Because there is a single PC 50 however, PEs 42 may only execute one of instructions 44 indicated by PC 50 at one particular at a given time.

Processors, such as GPU 12 may have extensive amount of vector registers and vector instructions. As such, a compiler, such as JIT compiler 18, which can compile applications using optimizations, such as vectorization, may increase the throughput or execution performance of a processor supporting vector instructions or which has a SIMD architecture, such as GPU 12.

More particularly, GPU 12 may include hundreds or thousands of shader cores similar to those illustrated in FIG. 2. Each shader core may be capable of executing vector instructions. Executing the vector instructions, which have multiple operands, may greatly improve performance relative to un-optimized code, which contains scalar instructions rather than vector instructions. Moreover, execution performance increases may be greater on an architecture with larger numbers of SIMD cores capable of executing vector instructions, as more general purpose processors may have a limited number of registers and/or cores capable of executing vector instructions.

FIG. 3A is a conceptual diagram illustrating kernel code that includes code that, when executed, may cause aliasing in accordance with the techniques of this disclosure. The example of FIG. 3A includes kernel code 80. Kernel code 80 includes lines 82, 84, 86, and 88.

Line 82 of kernel code 80 is a compute_output function. The compute_output function of line 82 is the function that the target processor (e.g., GPU 12) invokes when the kernel begins execution. It is roughly equivalent to the "int main( )" function in the C programming language in that the compute_output function is a program entry point that driver/runtime 19 uses to begin execution of kernel 20. If the target processor or is CPU 16, the C runtime library may comprise the runtime component of driver/runtime 19. If GPU 12 is the target processor, the driver component of driver/runtime 19 may comprise the runtime. The compute_output function includes four input arguments: (1) inputImage, (2) global_cdf, (3) outputImage, and (4) local_cdf. inputImage is a pointer to a buffer of input arguments. outputImage is a pointer to a buffer that when the kernel finishes executing, will include output arguments. The argument global_cdf and local_cdf are pointers to arrays of values. Line 84 may represent multiple statements that, when executed, cause GPU 12 to allocate and initialize variables. As an example, executing line 84 may cause PEs 42 to initialize and the load the values of inputImage[i], etc.

Line 86 is a loop initialization statement. The loop initialization statement indicates that the loop iterates for a fixed number of iterations. The loop begins iterating at a starting index, i, which is equal to the variable "start_offset," and increments i by one when each iteration finishes executing. At the completion of each loop iteration, GPU 12 check to see if Boolean condition "i <final_offset" is still true. GPU 12 stops executing the loop when value of i is equal to or greater than the value "final_offset."

Within each loop iteration, GPU 12 sets a value of outputImage at index i, denoted as outputImage[i] equal to a value of local_cdf[ inputImage[i]]. Local_cdf is an array, which in this example is indexed by the value of inputImage [i]. inputImage[i] is, in turn indexed by the variable i, which GPU 12 increments with each loop iteration.

As discussed above, outputImage and inputImage are both memory references. It is possible that the pointers to outputImage and inputImage may refer to the same region in memory (i.e. outputImage and inputImage alias, or alias partially). It is also possible that outputImage and inputImage may refer to different regions or overlapping regions in memory (i.e. outputImage and inputImage do not alias). If JIT compiler 18 is unable to determine whether inputImage and outputImage do not alias (i.e. do not refer to the exact same memory region), the compiler may not be able to use certain compiler optimizations, such as vectorization, code reordering, and/or loop unrolling.

FIG. 3B is a conceptual diagram illustrating an example of aliasing that a driver/runtime configured in accordance with the techniques of this disclosure may be able to detect. However, a compiler may not be able to optimize for the aliasing. The example of FIG. 3B illustrates a buffer 100 that GPU 12 may store in memory. For the purpose of examples, the pointers from FIG. 3B, outputImage and inputImage, may reference part of buffer 100. In the example of FIG. 3B, buffer 100 begins at memory address 0x800 (hexadecimal).

In this example, inputImage and outputImage both refer to a single entry (e.g., a single object, variable, etc.) stored within buffer 100. That is, in this example, inputImage and outputImage alias to the exact same memory region, which is indicated with cross hashing. Driver/runtime 19 may be able to detect that inputImage and outputImage refer to the same memory region. Because inputImage and outputImage refer to a same memory region, JIT compiler 18 is not able to perform optimizations, such as loop unrolling and/or vectorization.

Responsive to detecting that two memory references refer to a same memory region as illustrated in FIG. 3B, driver/runtime 19 may not generate any metadata. Additionally, JIT compiler 18 may not recompile kernel 20, as JIT compiler may do for the cases illustrated in FIGS. 3C-3D. Therefore, JIT compiler 18 may not perform any of the code optimizations as also illustrated in FIGS. 3C-3D.

FIG. 3C is a conceptual diagram illustrating an example of non-overlapping memory references, which a driver/runtime configured in accordance with the techniques of this disclosure may be able to detect. FIG. 3C illustrates buffer 120, which is the same buffer as illustrated in FIG. 3B. Buffer 120 similarly begins at the same memory address, 0x800, as buffer 100 of FIG. 3B.

In FIG. 3C, inputImage and outputImage are memory references that refer to two different memory regions of buffer 120. The memory region to which inputImage refers is indicated by horizontal hashing. The memory region to which outputImage refers is indicated by vertical hashing. Prior to execution of kernel code 80, and more particularly, lines 86 and 88, JIT compiler 18 may determine, no matter the value of i, that inputImage[i] and outputImage[i] will not refer to the same memory region during same iteration of the loop.

During runtime, driver/runtime 19 may be able to determine that inputImage[i] and outputImage[i] do not refer to a same memory region based on the initial values of inputImage[i] and outputImage[i], and based on the fact that the memory addresses of inputImage[i] and outputImage[i] do not converge over the course of iterating through loop 86. In other words, the referenced index of inputImage and outputImage is always referenced by the same index value, i, which GPU 12 monotonically increases.

Responsive to determining that memory references inputImage and outputImage do not refer to the same memory region, driver may generate metadata that indicates a relationship between inputImage and outputImage. The metadata may indicate that the memory regions associated with inputImage and outputImage do not overlap, and are separate by two entries, as an example. The metadata may also indicate the size of the regions associated with inputImage and ouptutImage, as well as the number of bytes between inputImage and outputImage. After generating the metadata, JIT compiler 18 may receive the metadata from driver/runtime 19, and recompile kernel 20 based on the metadata by applying various optimizations, as described in greater detail below.

FIG. 3D is a conceptual diagram illustrating overlapping memory references that a driver/runtime configured in accordance with the techniques of this disclosure may detect. FIG. 3D includes buffer 130, which may be an argument buffer, e.g. arguments 26 (FIG. 1). Buffer 130 begins at address 0x800 in this example. Buffer 130 includes multiple data values, which are illustrated as separate rectangles within the encompassing rectangle of buffer 130.

As in previous examples, inputImage and outputImage are memory references, which refer to regions of buffer 130. In this example, the regions that inputImage and outputImage reference overlap, but not entirely. The memory region that is associated only with inputImage is indicated with horizontally-hashed rectangles. The memory region associated only with outputImage is indicated with vertically hashed rectangles. The overlapping memory region referenced by both inputImage and outputImage is indicated with cross-hatched rectangles.

At run-time, driver determines whether the inputImage and outputImage memory references refer to a same memory region. In this example, inputImage and outputImage overlap, but do not refer to a same memory region. Driver/runtime 19 detects that inputImage and outputImage overlap, but are not identical, and generates metadata for JIT compiler 18. The metadata may indicate information about the regions associated with inputImage, and outputImage, such as the starting and ending address of each region. The metadata may further include information about the overlap region, such as the size of the overlap region, and the starting and/or ending addresses of the overlap region. JIT compiler 18 receives the metadata generated by driver/runtime 19, and may recompile kernel 20 by applying optimization techniques in accordance with this disclosure.

FIG. 4A is a conceptual diagram illustrating loop unrolling in accordance with the techniques of this disclosure. FIG. 4A includes code section 140, which generally corresponds to kernel code 80 illustrated in FIG. 3A. In the example of FIG. 4A, driver/runtime 19 and/or JIT compiler 18 may have determined that the memory references inputImage and outputImage do not refer to the same memory region, as illustrated in FIGS. 3C and 3D. Because inputImage and outputImage do not refer to the same memory region, JIT compiler 18 has performed loop unrolling on kernel code 80. Lines 142-150 illustrate the result of unrolling one iteration into four iterations.

Whereas lines 86 and 88 of FIG. 3A illustrate performing a single iteration and increments the variable i by one after each iteration, the unrolled loop of line 142 increments i by four after each iteration. Line 144 assigns the value of local_cdf[inputImage[i]] to outputImage[i]. Line 146 assigns the value of local_cdf[inputImage[i+1]] to outputImage[i+1]. Line 148 assigns the value of local_cdf[inputImage[i+2]] to outputImage[i+2], and line 150 assigns the value of local_cdf[inputImage[i+3]] to outputImage[i+3]. The result of lines 144-150 is to assign the output of local_cdf[inputImage[i+x]] to a corresponding value of outputImage[i+x], where x [0 . . . 3]. Thus, when executed, the unrolled loop code section illustrated in lines 142-150 has the same effect as four iterations of lines 86-88 of FIG. 3A.

The loop unrolling of code section 140 may have several benefits relative to loop code section 80 of FIG. 3A. A first advantage is that by ordering each of the assignments one after the other, JIT compiler 18 and/or driver/runtime 19 may be able to achieve better cache performance on the target processor, e.g. GPU 12 relative to the unordered code section.

For example, after executing line 144, GPU 12 may have stored some or all of the data of the memory regions associated with inputImage and outputImage in a cache, e.g. cache 48. If data needed to perform instructions is not stored in registers, e.g. registers 46, the data may need to be accessed from a cache, e.g. cache 48. More particularly, GPU 12 may store entries of inputImage and outputImage, e.g. inputImage[i+1], [i+2], etc., as well as outputImage [i+1], [i+2], etc in cache 48. If entries of inputImage and outputImage are stored in a cache of GPU 12, GPU 12 may be able to quickly access the data of the referenced indices of inputImage and outputImage of lines 144-150 from a cache as opposed to accessing the referenced indices from a slower memory.

Additionally, when code section 140 is unrolled, values of inputImage[i, i+1, i+2 . . . ], and outputImage[i, i+1, etc.] may be stored in a single cache line. In contrast when not unrolled, the values of inputImage and outputImage[i] may be stored in different cache lines. Retrieving all the values of inputImage from a single cache line in a single cache read, which may result from loop unrolling may be faster relative to performing multiple cache reads, which may result when executing unrolled code.

Accessing data from a cache of GPU 12 as opposed to accessing data from a slower system memory, e.g. system memory 14, may increase the performance of executing the loop of lines 142-150 relative to lines 86-88. In some examples, GPU 12 may also be able to execute lines 144-150 in parallel, for example on a processor that supports superscalar execution or a SIMD processor assuming there are no dependencies between lines 144-150, in which a value of inputImage or outputImage depends on a value previously calculated in kernel 20.

In addition to improving cache performance, loop unrolling as illustrated in code section 140 of FIG. 4A also reduces the number of times that GPU 12 evaluates the Boolean condition associated with the loop, as well as the number of jumps that GPU 12 executes after finishing each loop iteration. As compared to code section 80 of FIG. 3A, the code of lines 142-150 executes four lines per iteration before evaluating whether the Boolean condition, "i<final_offset" of line 142 is true. Code section 80 by contrast executes only one line before evaluating whether the Boolean condition of line 82 is true. Thus, the number of times that GPU 12 evaluates the Boolean condition of line 142 is reduced relative to the code section 80.

After GPU 12 completes an iteration of the loop of lines 142-150, and if GPU 12 determines that the Boolean condition, "i<final_offset," is still true, GPU 12 jumps from line 150 back to line 144. In code section 140, GPU 12 performs the jump after executing four lines. When executing code section 80, GPU 12 jumps after each iteration. Thus, relative to code section 80, the unrolled code of code section 140 reduces both the evaluation of the Boolean condition and the number of jumps that GPU 12 performs, which may improve the execution performance of executing code section 140.

FIG. 4B is a conceptual diagram illustrating code reordering in accordance with the techniques of this disclosure. FIG. 4B includes code section 160, which further includes lines 162, 164, 166, 168, 170, and 172. As discussed above, driver/runtime 19 and/or JIT compiler 18 may determine whether references to memory alias to the same region of memory. As discussed above with respect to FIG. 4A, JIT compiler 18 may perform certain optimizations, such as the loop unrolling illustrated in FIG. 4A, responsive to receiving metadata from driver/runtime 19 determining that there is no memory aliasing in a particular code section.

Another optimization that JIT compiler 18 and/or driver/compiler 19 may perform responsive to determining that memory references in a particular code section do not refer to the same memory region is code reordering, which FIG. 4B illustrates. Code 160 may generally correspond to a reordered assembly language representation of the unrolled code of FIG. 4B. JIT compiler 18 and/or driver/runtime 19 may apply code reordering to non-loop as well as loop code sections. In FIG. 4B, JIT compiler 18 has reordered the loads and stores of FIG. 4A such that all of the loads and stores are grouped together.

Lines 162 and 164 are load instructions, which JIT compiler 18 and/or driver/compiler 19 have grouped together. In FIG. 4A, a line, such as line 144 includes multiple load and store instructions. For example, to execute line 144, JIT compiler 18 may generate three separate instructions. The first instruction may be a load instruction, which loads the value from the memory location to which inputImage[i] refers into a register, denoted as r0. The second instruction may be a load instruction, which loads the value of local_cdf[inputImage[i]] and stores the loaded value into the same register, r0, thereby overwriting the previous value of r0. The final instruction included in line 144 may be a store instruction, which stores the value from r0 into the memory to which outputImage[i] refers.

Lines 162-172 illustrate reordered load and store instructions relative to the instructions that comprise lines 144-150. In line 162, the assembly code instructs GPU 12 to load (using a load instruction, "ldg") a value from the memory region to which inputImage[i] refers into register r0. Similarly, line 164 causes GPU 12 to load the value to which memory reference inputImage[i+1] refers into register r1. Subsequent instructions which may occur after lines 162 and 164, but before line 166, and which are not illustrated for the sake of brevity, may include additional load instructions that cause GPU 12 to load data from memory regions to which inputImage refers into registers.

In lines 166,168, and other lines not illustrated for brevity, JIT compiler 18 has grouped the loads from the buffer local_cdf together. Line 166 includes a load instruction that loads the contents of the local_cdf [r0], i.e. the contents of memory from the array local_cdf at index r0, and stores the contents of local_cdf[r0] into register r0, thereby overwriting the contents of r0. Similarly, the instruction of line 168 cause GPU 12 to store the contents to which the memory reference local_cdf refers at the index indicated by the value currently stored in register r1 into register r1. Thus, upon execution the instruction of 168 causes GPU 12 to overwrite the previous value of r1. Other instructions, which occur after line 168 and before line 170, and which are not illustrated for the sake of brevity, may similarly include instructions that, when executed, cause GPU 12 to load data from local_cdf[rx], where x is some integer.

As part of reordering the instructions of code section 140, JIT compiler 18 also groups store instructions together. As an example, of this, after reordering, JIT compiler 18 has grouped lines 170 and 172 together. Line 170 includes a store instruction that stores the contents of r0 into memory at location outputImage[i]. Similarly, line 172, when executed, causes GPU 12 to store the value of register r1 into memory at the location to which outputImage[i+1] references. Other instructions not illustrated for the sake of brevity, when executed, may similarly cause GPU 12 to store the value of a register, e.g. register rx, where x is an integer, to memory at location outputImage[i+x].

Reordering loads and stores may improve the performance of executing code 160 relative to code 80 of FIG. 3A. More particularly, reordering loads and stores may improve performance in certain cases depending on the cache line width. For example, code reordering may improve execution performance when coalescing a number of load instructions together may improve performance on a system having a cache line width that is a multiple of the size of the operand used in the scalar instruction.

FIG. 4C is a conceptual diagram illustrating code vectorization in accordance with the accordance with the techniques of this disclosure. FIG. 4C includes code section 180, which further includes lines 182, 184, and 186. As discussed above, JIT compiler 18 and/or compiler/driver 19 may perform certain optimizations, such as the loop unrolling illustrated in FIG. 4A, responsive to determining that memory references in the code section do not reference the same memory region. JIT compiler 18 and/or compiler/driver 19 is configured to vectorize a loop code section based on metadata from driver/runtime 19 that includes information relating to the memory references of that code section.

Vectorization is a process in which a compiler (e.g., JIT compiler 18) and/or driver/runtime 19 combines multiple scalar instructions, each having a single operand, into a single vector instruction having multiple operands. Vectorization is a form of parallelization that improves execution performance by reducing the number of instructions that a processor is required to execute to complete a particular code section as well as by making use of the inherent hardware capability to move data between system memory 14 and GPU 12. In the example of code section 180 of FIG. 4C, JIT compiler 18 may reorder the loads and stores as illustrated in FIG. 4B. Once JIT compiler 18 has reordered the loads and stores, JIT compiler 18 may then vectorize groups of similar instructions, as illustrated in FIG. 4C.

In line 182, JIT compiler 18 has combined multiple load (ldg) instructions into a single vectorized instruction. When executed, the vectorized instruction loads inputImage at indices [i]-[i+3] to registers r0-r3. Similarly, in line 184, JIT compiler 18 combines the multiple load instructions of lines 166, 168, etc. to a single vectorized load instruction that loads the values of local_cdf[r0-r3] into registers r0-r3. Also, in line 186, JIT compiler 18 has combined the stores ("stg" instructions) of lines 170-172 into a single vectorized store instruction that stores the values of registers r0-r3 into outputImage[i]-outputImage[i+3].

To reorder or vectorize instructions as illustrated in FIGS. 4B and 4C, JIT compiler 18 and/or driver/runtime 19 must respect any dependences. A dependence is a relationship that produces execution order constrains between statement or instructions. As an example, there is a dependence for a statement S2 on another statement S1 if S1 must be executed before S2. In order to determine whether dependences prohibit vectorization and/or code reordering, JIT compiler 18 and/or driver/runtime 19 may perform dependence analysis before reordering or vectorizing code in accordance with the techniques of this disclosure based on the metadata obtained from driver/runtime 19.

Figure 5:
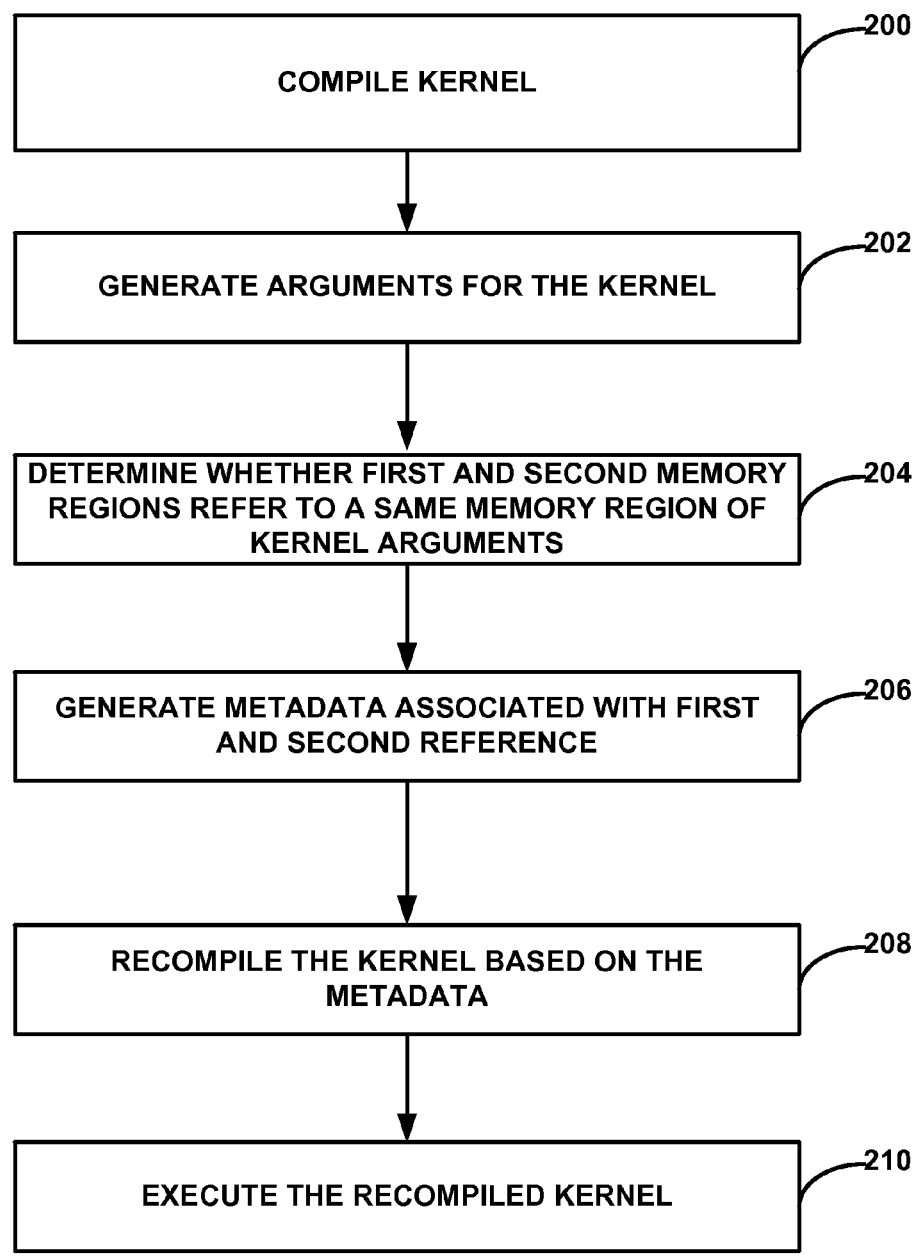
FIG. 5 is a flow diagram an example method for generating compiler metadata to aid compiler optimization in accordance with the techniques of this disclosure.

FIG. 5 is a flow diagram illustrating an example method for generating compiler metadata to aid compiler optimization in accordance with the techniques of this disclosure. It should generally be understood that the method of FIG. 5 may be performed by at least one of a group consisting of JIT compiler 18 and driver/runtime 19 executing compiling processor, e.g., CPU 16, and a target processor, e.g. GPU 12. In some examples the target processor and the compiling processor may be the same. Additionally, there may be more than one compiling processor and/or target processor.

In the method of FIG. 5, a compiling processor, e.g. CPU 16 uses driver/runtime 19 and/or JIT compiler 18 to generate arguments (e.g., kernel arguments 26) for executing binary code or bytecode of compiled kernel 20 (202). Driver/runtime 19 and/or JIT compiler 18 further determines whether a first memory reference to a first memory region of kernel arguments 26 and a second memory reference to a second memory region of kernel arguments 26 refer to a same memory region of kernel arguments 26 (204) or other examples of possible relationships as illustrated in FIGS. 3B, 3C, and 3D.

CPU 16 uses driver/runtime 19 and/or JIT compiler 18 to generate metadata associated with the first memory reference and the second memory reference (206). The metadata indicates a relationship between the first memory region and the second memory region, such as an overlap region between the first memory region and the second memory region. The metadata may further include a number of bytes of overlap between the first and second memory regions. In some examples, the metadata may include a starting address of the memory overlap and an ending address of the memory overlap region. It should be understood that the examples described with respect to FIG. 5 refer to a single pair of memory references for the purposes of example only. Driver/runtime 19 and/or JIT compiler 18 may derive metadata for all pairs of memory references of kernel arguments 26.

Responsive to determining, using driver/runtime 19, that the first and second memory references do not refer to the same memory region of kernel arguments 26, JIT compiler 18 executing on CPU 16 may cause CPU 16 to recompile kernel 20 using JIT compiler 18 based on the metadata (208). Finally, the target processor, e.g. GPU 12, may execute the recompiled kernel (210). In some examples, driver/runtime 19 and/or JIT compiler 18 may determine that the first and second memory references do not refer to the same memory region based on the metadata, and may recompile kernel 20 with optimizations using this information.

In some additional examples, to determine whether the first memory reference and the second memory reference of kernel 20 refer to the same memory region, CPU 16 may use driver/runtime 19 to determine a loop code section of kernel 20 that includes the first and second memory references. And, to recompile the kernel, JIT compiler 18 may unroll the loop code section based on the metadata generated by driver/runtime 19 and/or JIT compiler 18. To recompile the kernel, JIT compiler 18 may also reorder at least one of a load operation and a store operation and a store operation of the loop code section or vectorize a plurality of scalar instructions of the loop code section into at least one vector instruction based on the generated metadata. In various examples, JIT compiler 18 may recompile kernel 20 using a heterogeneous framework, such as Microsoft DirectCompute and/or OpenCL by the Khronos Group.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of compiling kernels for execution comprising:
    compiling, by a compiler executing on a compiling processor, a kernel;
    generating, by at least one of a group consisting of the compiler and a driver executing on the compiling processor, kernel arguments for executing code of the compiled kernel;
    determining, by the at least one of the group consisting of the compiler and the driver executing on the compiling processor, whether a first memory reference to a first memory region of the kernel arguments and a second memory reference to a second memory region of the kernel arguments refer to a same memory region;
    generating, by the at least one of the group consisting of the compiler and the driver executing on the compiling processor, metadata associated with the first memory reference and the second memory reference based on the determination, wherein the metadata indicates a relationship between the first memory region and the second memory region; and
    responsive to determining, by the at least one of the group consisting of the compiler and the driver executing on the compiling processor, that first and second memory references of the kernel arguments do not refer to the same memory region:
        recompiling, by the compiler executing on the compiling processor, the kernel based on the metadata; and
        instructing, by the at least one of the group consisting of the compiler and the driver executing on the compiling processor, a target processor to execute the recompiled kernel.

2. The method of claim 1,
    wherein determining whether the first memory reference and the second memory reference of the kernel arguments refer to the same memory region further comprises: determining, by the at least one of the group consisting of the compiler and the driver executing on the compiling processor, a loop code section of the kernel that includes the first and second memory references, and
    wherein recompiling the kernel comprises: unrolling the loop code section based on the metadata, and compiling the unrolled loop code section.

3. The method of claim 1,
    wherein determining whether the first memory reference and the second memory reference of the kernel arguments refer to the same memory region further comprises: determining, by the at least one of the group consisting of the compiler and the driver executing on the compiling processor, a code section of the kernel that includes the first and second memory references, and wherein recompiling the kernel further comprises: responsive to determining that the first and second memory references of the code section do not refer to the same memory region, reordering at least one of a load operation and a store operation of the code section based on the metadata.

4. The method of claim 1, wherein determining whether the first memory reference and the second memory reference of the kernel arguments refer to the same memory region further comprises: determining, by the at least one of the group consisting of the compiler and the driver executing on the compiling processor, a code section of the kernel that includes the first and second memory references, and wherein recompiling the kernel further comprises: responsive to determining that the first and second memory references of the code section do not refer to the same memory region, vectorizing a plurality of scalar instructions of the code section into at least one vector instruction based on the metadata.

5. The method of claim 1, wherein the metadata indicates an overlap region between the first memory region and the second memory region.

6. The method of claim 5, wherein the metadata includes a number of bytes of overlap between the first memory region and the second memory region.

7. The method of claim 5, wherein the metadata comprises at least one of a starting address of the memory overlap region and an ending address of the memory overlap region.

8. The method of claim 1, wherein the compiling processor comprises a central processing unit (CPU) and the target processor comprises a graphics processing unit (GPU).

9. The method of claim 1, wherein the compiler recompiles the kernel using a heterogeneous computing framework comprising at least one of Microsoft DirectCompute, and OpenCL.

10. The method of claim 1, wherein the kernel arguments comprise a buffer area of memory allocated for the arguments.

11. A device comprising:
a memory; and
a compiling processor configured to:
compile, by a compiler of the compiling processor, a kernel;
generate, by at least one of a group consisting of the compiler and a driver of the compiling processor, kernel arguments for executing code of the compiled kernel;
determine, by the at least one of the group consisting of the compiler and the driver of the compiling processor, whether a first memory reference to a first memory region of the kernel arguments and a second memory reference to a second memory region of the kernel arguments refer to a same memory region;
generate, by the at least one of the group consisting of the compiler and the driver of the compiling processor, metadata associated with the first memory reference and the second memory reference based on the determination, wherein the metadata indicates a relationship between the first memory region and the second memory region; and
responsive to determining, by the at least one of the group consisting of the compiler and the driver of the compiling processor, that first and second memory references of the kernel arguments do not refer to the same memory region:
recompile, by the compiler of the compiling processor, the kernel based on the metadata; and
instruct, by the at least one of the group consisting of the compiler and the driver of the compiling processor, a target processor to execute the recompiled kernel.

12. The device of claim 11,
wherein to determine whether the first memory reference and the second memory reference of the kernel arguments refer to the same memory region, the compiling processor is further configured to: determine, by the at least one of the group consisting of the compiler and the driver of the compiling processor, a loop code section of the kernel that includes the first and second memory references, and wherein to recompile the kernel, the compiling processor is further configured to: unroll the loop code section based on the metadata, and compile the unrolled loop code section.

13. The device of claim 11,
wherein to determine whether the first memory reference and the second memory reference of the kernel arguments refer to the same memory region, the compiling processor is further configured to: determine, by the at least one of the group consisting of the compiler and the driver of the compiling processor, a code section of the kernel that includes the first and second memory references, and wherein to recompile the kernel, the compiling processor is further configured to: responsive to determining that the first and second memory references of the code section do not refer to the same memory region, reorder at least one of a load operation and a store operation of the code section based on the metadata.

14. The device of claim 11,
wherein to determine whether the first memory reference and the second memory reference of the kernel arguments refer to the same memory region, the compiling processor is further configured to: determine, by the at least one of the group consisting of the compiler and the driver of the compiling processor, a code section of the kernel that includes the first and second memory references, and wherein to recompile the kernel, the compiling processor is further configured to:
responsive to determining that the first and second memory references of the code section do not refer to the same memory region, vectorize a plurality of scalar instructions of the code section into at least one vector instruction based on the metadata.

15. The device of claim 11, wherein the metadata indicates an overlap region between the first memory region and the second memory region.

16. The device of claim 15, wherein the metadata includes a number of bytes of overlap between the first memory region and the second memory region.

17. The device of claim 15, wherein the metadata comprises at least one of a starting address of the memory overlap region and an ending address of the memory overlap region.

18. The device of claim 11, wherein the compiling processor comprises a central processing unit (CPU) and the target processor comprises a graphics processing unit (GPU).

19. The device of claim 11, wherein the compiler recompiles the kernel using a heterogeneous computing framework comprising at least one of Microsoft DirectCompute, and OpenCL.

20. The device of claim 11, wherein the kernel arguments comprise a buffer area of memory allocated for the arguments.

21. A non-transitory computer-readable storage medium that includes instructions stored thereon that, when executed, cause a compiling processor to:
compile, by a compiler of the compiling processor, a kernel;
generate, by at least one of a group consisting of the compiler and a driver of the compiling processor, kernel arguments for executing code of the compiled kernel;
determine, by the at least one of the group consisting of the compiler and the driver of the compiling processor, whether a first memory reference to a first memory region of the kernel arguments and a second memory reference to a second memory region of the kernel arguments refer to a same memory region;
generate, by the at least one of the group consisting of the compiler and the driver of the compiling processor, metadata associated with the first memory reference and the second memory reference based on the determination, wherein the metadata indicates a relationship between the first memory region and the second memory region; and
responsive to determining, by the at least one of the group consisting of the compiler and the driver of the compiling processor, that first and second memory references of the kernel arguments do not refer to the same memory region:
recompile, by the compiler of the compiling processor, the kernel based on the metadata; and
instruct, by the at least one of the group consisting of the compiler and the driver of the compiling processor, a target processor to execute the recompiled kernel.

22. The non-transitory computer-readable storage medium of claim 21,
wherein the instructions that cause the compiling processor to determine whether the first memory reference and the second memory reference of the kernel refer to the same memory region, further comprise instructions that, when executed, cause the compiling processor to: determine, by the at least one of the group consisting of the compiler and the driver of the compiling processor, a loop code section of the kernel that includes the first and second memory references, and
wherein the instructions that cause the compiling processor to recompile the kernel further comprise instructions that, when executed, cause the compiling processor to: unroll the loop code section based on the metadata, and compile the unrolled loop code section.

23. The non-transitory computer-readable storage medium of claim 21,
wherein the instructions that cause the compiling processor to determine whether the first memory reference and the second memory reference of the kernel arguments refer to the same memory region further comprise instructions that, when executed, cause the compiling processor to: determine, by the at least one of the group consisting of the compiler and the driver of the compiling processor, a code section of the kernel that includes the first and second memory references, and
wherein the instructions that cause the compiling processor to recompile the kernel further comprise instructions that, when executed, cause the compiling processor to: responsive to determining that the first and second memory references of the code section do not refer to the same memory region, reorder at least one of a load operation and a store operation of the code section based on the metadata.

24. The non-transitory computer-readable storage medium of claim 21,
wherein the instructions that cause the compiling processor to determine whether the first memory reference and the second memory reference of the kernel arguments refer to the same memory region further comprise instructions that, when executed, cause the compiling processor to: determine, by the at least one of the group consisting of the compiler and the driver of the compiling processor, a code section of the kernel that includes the first and second memory references, and
wherein the instructions that cause the compiling processor to recompile the kernel further comprise instructions that, when executed, cause the compiling processor to: responsive to determining that the first and second memory references of the code section do not refer to the same memory region, vectorize a plurality of scalar instructions of the code section into at least one vector instruction based on the metadata.

25. The non-transitory computer-readable storage medium of claim 21, wherein the metadata indicates an overlap region between the first memory region and the second memory region.

26. The non-transitory computer-readable storage medium of claim 25, wherein the metadata includes a number of bytes of overlap between the first memory region and the second memory region.

27. The non-transitory computer-readable storage medium of claim 25, wherein the metadata comprises at least one of a starting address of the memory overlap region and an ending address of the memory overlap region.

28. The non-transitory computer-readable storage medium of claim 21, wherein the compiling processor comprises a central processing unit (CPU) and the target processor comprises a graphics processing unit (GPU).

29. The non-transitory computer-readable storage medium of claim 21, wherein the compiler recompiles the kernel using a heterogeneous computing framework comprising at least one of Microsoft DirectCompute, and OpenCL.

30. The non-transitory computer-readable storage medium of claim 21, wherein the kernel arguments comprise a buffer area of memory allocated for the arguments.

* * * * *